United States Patent [19]
Goddard et al.

[11] Patent Number: 5,765,598
[45] Date of Patent: Jun. 16, 1998

[54] PIPE CONSTRUCTION

[75] Inventors: James B. Goddard, Powell, Ohio; Lester H. Gabriel, Sacramento, Calif.

[73] Assignee: Advanced Drainage Systems, Inc., Columbus, Ohio

[21] Appl. No.: 546,583

[22] Filed: Oct. 23, 1995

[51] Int. Cl.[6] .................................................. F16L 9/18
[52] U.S. Cl. ............................ 138/115; 138/116; 138/129
[58] Field of Search ................................. 138/112, 113, 138/116, 117, 129, 115

[56] References Cited

U.S. PATENT DOCUMENTS

| | | |
|---|---|---|
| 1,093,766 | 4/1914 | Campfield . |
| 3,464,450 | 9/1969 | Steffenini .................. 138/113 |
| 3,495,628 | 2/1970 | Boender ..................... 138/150 |
| 3,750,058 | 7/1973 | Bankert, Sr. et al. .......... 138/113 |
| 4,215,727 | 8/1980 | ter Wijlen ................... 138/112 |
| 4,461,323 | 7/1984 | Morikawa . |
| 4,529,009 | 7/1985 | Horner et al. ................ 138/113 |
| 5,497,809 | 3/1996 | Wolf ........................ 138/DIG. 8 |

Primary Examiner—David Scherbel
Assistant Examiner—James F. Hook
Attorney, Agent, or Firm—Kremblas, Foster, Millard & Pollick

[57] ABSTRACT

An improved pipe construction is disclosed having an inner and outer surface, intermediate walls extending between the inner and outer surfaces, and a plurality of primary and secondary internal cells. There are twice as many secondary internal cells as there are primary internal cells. Each of the primary internal cells is of a circular cross-section, while each of the secondary internal cells is of a three-sided cross-section. The primary and secondary cells are wound about the central longitudinal axis of the pipe. A method of forming the pipe of this structure is also disclosed.

18 Claims, 3 Drawing Sheets

PIPE CONSTRUCTION

BACKGROUND OF THE INVENTION

The present invention relates generally to plastic pipe, and more particularly, pipe wall construction having apertures formed within the pipe wall.

A number of inventions have been made concerning pipe and more particularly plastic pipe, with regard to the cross sectional configuration of such pipe. One of the primary concerns of pipe manufacturers is the cost associated with the plastic used to fabricate pipe. Another of the concerns is structural stability, such that the pipe possesses adequate strength to resist collapsing, especially, for example, in applications where the pipe is buried underground.

Attempts have been made to fabricate pipe with apertures being formed within the pipe so as to reduce the total amount of plastic necessary for fabrication. Petzetakis, U.S. Pat. No. 3,926,223, discloses a pipe assembly formed from a spirally wound tube incorporating one of a variety of differently shaped apertures. The finished pipe consists of a multiplicity of helical turns of an extruded strip with the strip having a single aperture therein. The lateral surfaces of the strip have to be relatively thick in order to maintain the integrity of the pipe.

Boender, U.S. Pat. No. 3,495,628, also discloses a variety of tubular constructions comprising a wound strip or pipe wall segment, with each pipe wall segment having a plurality of apertures formed therein. The tubular construction of Boender requires the pipe segment to have an outer marginal edge coacting with and overlapping a separate portion of the outer wall of the pipe segment, along with an inner marginal edge coacting with and overlapping a separate portion of the inner wall of the pipe segment.

While Petzetakis and Boender, from a theoretical standpoint, appear to result in pipe having continuous smooth inner and outer wall surfaces, and in pipe requiring substantially less plastic, resulting in pipes of at least equal strength to solid wall pipe, repeated attempts by pipe manufacturers to fabricate pipe of a cross-section similar to Boender, and then wind the pipe segment in a spiral so as to form a finished tube have found that the inner and outer walls exhibited a tendency to bend or otherwise result in an inappropriate quality of fabrication. Furthermore, the single aperture bodies of Petzetakis resulted in a plastic pipe which still required an unacceptably high amount of plastic.

Research into the formation of an improved embodiment of a pipe wall segment attempted to modify the overlapping marginal edges of Boender, such that the opposing side edges of the pipe wall segment were generally "s-shaped" so as to cooperate with adjacent lateral edge surfaces. However, it was discovered that this pipe segment design also resulted in sidewalls which collapsed and deformed, thereby resulting in pipe failure. The pipe lacked structural integrity, and in addition the finished tube looked bad.

Campfield, U.S. Pat. No. 1,093,766; Marissen et al, U.S. Pat. No. 4,428,591; and Morikawa et al, U.S. Pat. No. 4,461,323, all disclose pipe cross-sections with a plurality of longitudinally extending channels which extend parallel to the longitudinal axis of the pipe assembly. Campfield discloses a conduit formed from a number of arcuate sections, each of which sections have a plurality of compartments extending therethrough parallel to the longitudinal axis of the conduit. The compartments are formed as a result of the placement of partitions and reinforcing means. Each of the compartments are preferably rectangular, oblong, or trapezoidal in shape, with only two being shown as circular, and that only in one embodiment of the invention.

Meanwhile, Marissen et al discloses a plastic pipe provided with at least one groove near its end. Between the internal and external walls of the pipe of Marissen et al are a plurality of longitudinally extending partitions and longitudinally extending channels. Although Marissen discloses that the groove may be formed so as to be helical, the internal channels are always oriented in a straight, longitudinal direction.

Finally, Morikawa et al discloses an extrudable pipe assembly having an outer pipe and an inner pipe, with both pipes having the same curvature. The two pipes are connected by a series of horizontal and vertical walls, such that the compartments formed within the pipe all have between two and four sides linearly oriented to each other at right angles.

Two other prior art pipe assemblies deserve comment, so that a proper understanding of existing pipe technology will exist. The first such assembly is manufactured by Wavin B. V., the assignee of the Marissen et al patent, and sold under the trademark WAVINHOL. It is an extruded pipe with small holes in it. The weight of the pipe is slightly less than that of a solid wall pipe, and the strength is approximately the same. Although it bears some similarity to the pipe of Marissen et al, the relative dimensions of the holes to the wall thickness appear different from what is disclosed in FIG. 2 of Marissen et al.

The other prior art assembly mentioned in the preceding paragraph is sold by Armco pipe under the trademark ARMCO TRUSS PIPE and features a "Warren truss" internal design, whereby for each arm in tension, one is in compression. As in Maraissen et al, there is no winding of the pipe, such that the channels formed as part of the "Warren truss" are all oriented straight and longitudinally. The pipe is extruded using a plastic such as ABS or PVC, with the internal channels then being fortified by the deposition therein of concrete.

It is thus apparent that the need exists for an improved pipe structure which provides a strong, yet light weight alternative to solid wall pipe, as well as to other prior art alternatives having apertures formed therein. Additionally, it is apparent that the need exists for a method for forming pipe having the aforementioned improved pipe structure.

SUMMARY OF THE INVENTION

The problems associated with the prior plastic pipe and manner of making the same are overcome in accordance with the present invention by forming an improved extruded plastic pipe structure comprising an outer surface, an inner surface, a plurality of primary internal cells and a plurality of secondary internal cells. The outer surface has an outer surface first side and an outer surface second side. The inner surface has an inner surface first side and an inner surface second side. The plurality of primary internal cells are formed between the outer surface and the inner surface, with the primary internal cells extending the distance from the outer surface second side to the inner surface second side. The plurality of secondary internal cells are formed between the outer surface and the inner surface, with the primary internal cells being larger in size than the secondary internal cells, and with the number of secondary internal cells to primary internal cells being of a ratio of 2:1. The primary internal cells and the secondary internal cells extend longitudinally the length of the pipe, with the pipe having a longitudinal central axis extending the length of said pipe, such that the primary internal cells and the secondary internal cells are wound about said longitudinal central axis in a cycle of twist. The pipe has an inner diameter with the ratio of the length of the pipe to the inner diameter for each cycle of twist being in the range of between 2:1 to 7:1.

Furthermore, while each of the primary internal cells in the preferred embodiment of the invention is preferably of a circular shape, it should be appreciated that these primary internal cells have as their structure closed geometric figures with two boundaries, of which circles and ellipses are examples, from which the pipe gains its enhanced tortional rigidity. Still further, each of the secondary internal cells is preferably of a three-sided configuration. Each primary internal cell comprises an internal cell side wall, with the internal cell side wall having a plurality of segments.

Still further, the pipe structure of this invention has an internal cell wall which includes a first segment which is coterminous with the outer surface. The internal cell wall's second segment is conterminous with the inner surface. The internal wall's third segment is intermediate the outer surface and the inner surface, with the third segment being coterminous with the internal cell wall of a first adjacent primary internal cell. The internal cell wall's fourth segment is intermediate the first and third segments. The internal cell wall's fifth segment is intermediate the second and third segments. The internal cell wall's sixth segment is intermediate the outer surface and the inner surface, with the sixth segment being coterminous with the internal cell wall of a second adjacent primary internal cell. The internal cell wall's seventh segment is intermediate the second and sixth segments. The internal cell wall's eighth segment is intermediate the sixth and first segments. The ratio of the length of the pipe to the inner diameter for each cycle of twist is more preferably in the range of between 3:1 to 5:1.

There is also disclosed an improved extruded plastic pipe structure comprising an outer surface, an inner surface, a plurality of primary internal cells and a plurality of secondary internal cells. The outer surface has an outer surface first side and an outer surface second side. The inner surface has an inner surface first side and an inner surface second side. The plurality of primary internal cells are formed between the outer surface and the inner surface, and extend the distance from the outer surface second side to the inner surface second side. The plurality of secondary internal cells are formed between the outer surface and the inner surface, with the primary internal cells being larger in size than the secondary internal cells. The number of secondary internal cells to primary internal cells is of a ratio of 2:1. Furthermore, while each of the primary internal cells in the preferred embodiment of the invention is preferably of a circular shape, it should be appreciated that these primary internal cells have as their structure closed geometric figures with two boundaries, of which circles and ellipses are examples. Each of the secondary internal cells are of a three-sided configuration.

Each primary internal cell comprises an internal cell side wall, with the internal cell side wall having a plurality of segments. The internal cell wall includes a first segment which is conterminous with the outer surface. The internal cell wall's second segment is coterminous with the inner surface. The internal cell wall's third segment is intermediate the outer surface and the inner surface, with the third segment being coterminous with the internal cell wall of a first adjacent primary internal cell. The internal cell wall's fourth segment is intermediate the first and third segments. The internal cell wall's fifth segment is intermediate the second and third segments. The internal cell wall's sixth segment is intermediate the outer surface and the inner surface, with the sixth segment being coterminous with the internal cell wall of a second adjacent primary internal cell. The internal cell wall's seventh segment is intermediate the second and sixth segments. The internal cell wall's eighth segment is intermediate the sixth and first segments. Furthermore, the primary internal cells and the secondary internal cells extend longitudinally the length of the pipe. The pipe has a longitudinal central axis extending the length of the pipe, with the primary internal cells and the secondary internal cells being wound about the longitudinal central axis in a cycle of twist. The pipe of this invention has an inner diameter with the ratio of the length of the pipe to the inner diameter for each said cycle of twist preferably being in the range of between 2:1 to 7:1. More preferably the ratio of the length of the pipe to the inner diameter for each cycle of twist is in the range of between 3:1 to 5:1.

There is also disclosed a method for forming an improved extruded plastic pipe structure comprising the steps of extruding plastic having a circular cross-section, and twisting said plastic as it is extruded. The extruded plastic has an outer surface, with the outer surface having an outer surface first side and an outer surface second side. The extruded plastic also has an inner surface, with the inner surface having an inner surface first side and an inner surface second side. Additionally the extruded plastic has a plurality of primary internal cells formed between the outer surface and the inner surface, with the primary internal cells extending the distance from the outer surface second side to the inner surface second side. There also are a plurality of secondary internal cells formed between the outer surface and the inner surface, with the primary internal cells being larger in size than the secondary internal cells. The number of secondary internal cells to primary internal cells is of a ratio of 2:1. The primary internal cells and the secondary internal cells extend longitudinally the length of the pipe, with the pipe having a longitudinal central axis extending the length of pipe.

As the plastic is twisted following its extrusion, the primary internal cells and the secondary internal cells are wound about the longitudinal central axis in a cycle of twist. The pipe has an inner diameter with the ratio of the length of the pipe to the inner diameter for each cycle of twist preferably being in the range of between 2:1 to 7:1. More preferably, the ratio of the length of the pipe to the inner diameter for each cycle of twist is in the range of between 3:1 to 5:1.

It is the primary object of the present invention to provide a pipe construction which while using significantly less plastic still results in a structurally stable pipe. An important aspect of the invention is the inclusion in the pipe wall of a plurality of primary and secondary apertures.

Other objects and advantages of the invention will be apparent from the following description, the accompanying drawings, and the appended claims.

BRIEF DESCRIPTION OF THE DRAWINGS

FIG. I is a perspective view of a pipe formed from the pipe wall segment of the present invention.

DETAILED DESCRIPTION OF THE INVENTION

Figure 1:
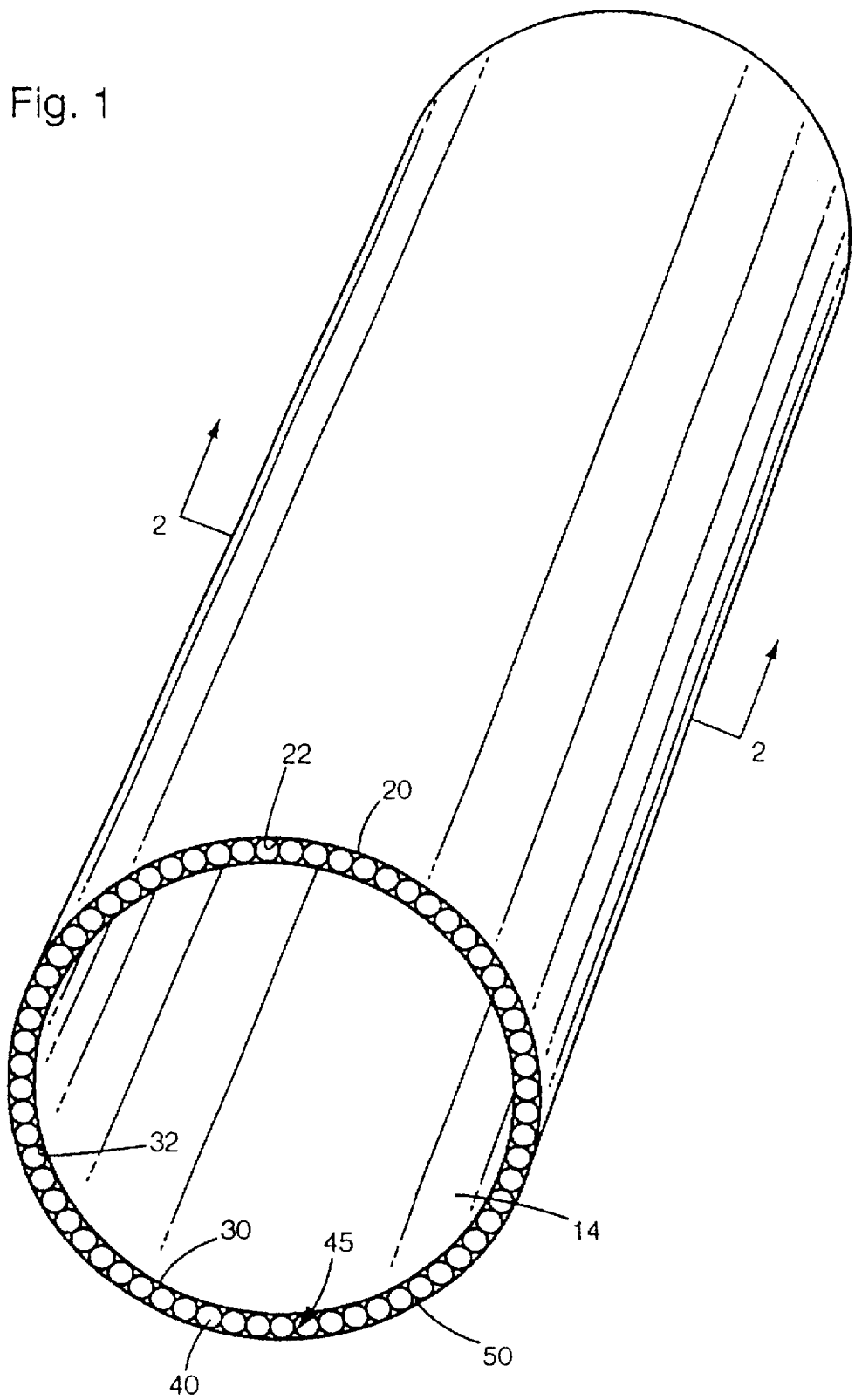

Having reference to the drawings, attention is directed first to FIG. 1, which discloses a perspective view of a pipe made in accordance with the present invention, with the pipe being designated generally by the numeral 10. Pipe 10 is comprised of a wall having an outer surface 12 and an inner surface 14.

Figure 2:
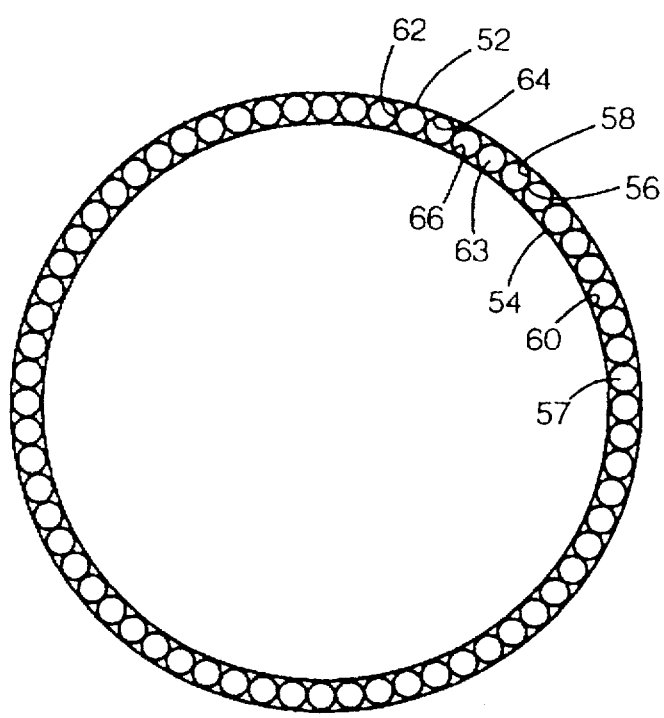
FIG. 2 is a vertical cross-sectional view of the pipe wall segment of the present invention taken along line 2—2 of FIG. 1.
Figure 3:
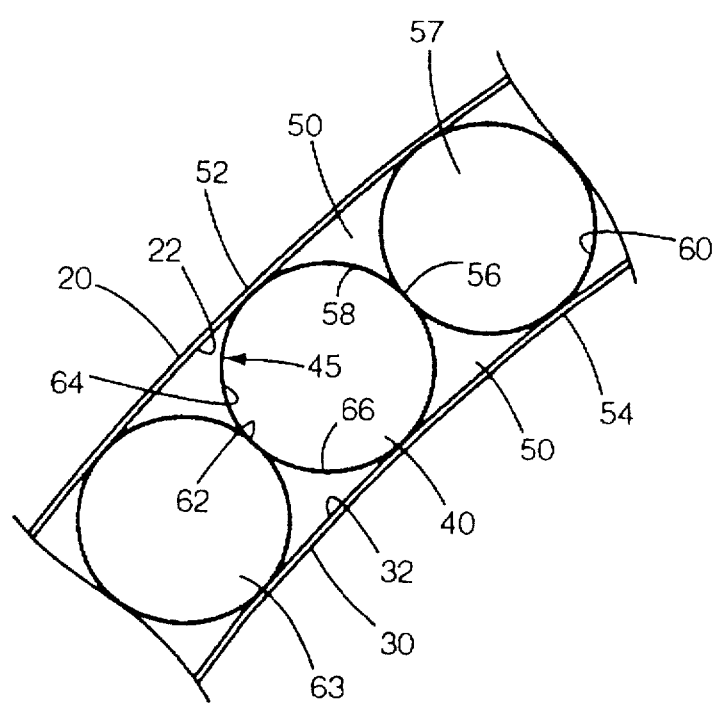
FIG. 3 is a vertical cross-sectional view of a portion of the pipe wall structure shown in FIG. 2 on a greatly enlarged scale.

As can be seen by reference to FIGS. 2 and 3 as well, the outer surface 12 is comprised of an outer surface first side 20, which corresponds to the exterior surface of the improved pipe 10, and an outer surface second side 22, which corresponds to the interior side of outer surface 12. Similarly, inner surface 14 is comprised of an inner surface first side 30, which corresponds to the interior of inner surface 14, and inner surface second side 32, which corresponds to the exterior or more centrally oriented side of inner surface 14.

Between outer surface 12 and inner surface 14 are formed a plurality of primary internal cells 40. Each of the primary internal cells in the preferred embodiment of the invention is preferably of a circular shape, however, it should be appreciated that these primary internal cells have as their structure closed geometric figures with two boundaries, of which circles and ellipses are examples, from which the pipe gains its enhanced tortional rigidity. Each of these primary internal cells is formed having an internal cell sidewall 45. It will be noted that a plurality of secondary internal cells 50, each of which has a three-sided configuration, are formed directly adjacent the outer surface 12 and inner surface 14. Each of these secondary internal cells are in ratio, numerically, of 2:1 to the primary internal cells.

As can best be seen by reference to FIG. 3, the pipe structure of this invention is formed from extruded plastic, preferably PVC, although other suitable plastics or extrudable materials could be used. Most importantly, it will be noted that in the preferred embodiment of the invention the outer wall 12 and inner wall 14 are equal in thickness, and that the thickness of the internal cell sidewall 45 is also in thickness of walls 12 and 14. Each primary internal cell 40 extends the entire distance from outer surface second side 22 to inner surface second side 32. Furthermore, as can be easily recognized by reference to the drawing figures, the primary internal cell is larger in size than any of the secondary internal cells. Still further, it will be recognized that this pipe structure cross-section incorporates aspects of "I-beam", "circle", and "arch bridge" engineering.

It should also be recognized that the internal cell sidewall 45 is comprised of a plurality of coterminous segments which essentially are subdivided into 8 segments. The first segment 52 is one which is coterminous with the outer surface 12, while the second segment is coterminous with the inner surface 14. Third segment 56 is a side portion of the internal cell sidewall 45 which is coterminous with the internal cell sidewall of a first adjacent primary internal cell 57. The fourth segment 58 can be seen as being intermediate the first and third segments and in fact is directly adjacent both segments. Meanwhile, the fifth segment is intermediate the second and third segments, and once again is directly adjacent those two segments.

On the opposite side of the primary internal cell 40 from the portion of the internal cell sidewall designated as third segment 56, is sixth segment 62. Just as third segment 56 is directly adjacent a first adjacent primary internal cell, sixth segment 62 is coterminous with the internal cell sidewall of second adjacent primary internal cell 63. Seventh segment 64 is intermediate the second and sixth segments, and in fact is directly adjacent both of those segments. Finally, eighth segment 66 is intermediate the sixth and first segments, and in the preferred embodiment of the invention is shown in FIG. 3 will be recognized as being directly adjacent those segments.

As opposed to other prior art pipes having apertures shown as being formed in the sidewall of the pipe when the pipe structure is subjected to a vertical cross-sectional analysis, similar to that which is shown in FIGS. 1 and 2, the pipe structure of this invention has its complete vertical cross section formed as a unitary extruded pipe structure as opposed to having a pipe structure formed by the winding and subsequent attachment of spirally wound pipe wall segments. Additionally, the pipe structure of this invention differs from previous pipe design in that while the primary internal cells and secondary internal cells of this invention extend the length of the pipe, they extend so in a longitudinal manner essentially parallel to the longitudinal central axis of the pipe itself. The primary internal cells and secondary internal cells of this invention however are wound about the longitudinal central axis in a unique cycle of twists. Preferably this results in turning the extrudate in such a way to cause the profile to be formed in a helix angle of 40°–50°. Furthermore, the pipe structure of this invention has an inner diameter such that the ratio of the length of the pipe to the inner diameter for each cycle of twists is in the range of between 2:1 to 7:1 and more preferably in the range of 3:1 to 5:1. By way of a more specific example, where the ratio is 3:1, the pipe would be formed such that for a 1' diameter pipe, one complete twist of the pipe (360° winding) occurs every three feet.

It has been unexpectedly discovered that as a result of the twisting method of fabrication, the moment of inertia associated with the pipe both circumferentially and longitudinally has been increased. Therefore, there is greater strength associated with this pipe as a consequence of the better strength to weight ratio. The pipe formed using the method described in this invention maybe formed having a variety of diameters as set forth in the following Table 1.

TABLE 1

| Wall Thickness Range | | | | | |
|---|---|---|---|---|---|
| Diameter Of Pipe | | Wall Thickness | | | |
| | | Minimum | | Maximum | |
| mm | in | mm | in | mm | in |
| 100 | 4 | 8 | 0.3 | 10 | 0.4 |
| 150 | 6 | 11 | 0.5 | 16 | 0.6 |
| 200 | 8 | 16 | 0.6 | 21 | 0.8 |
| 250 | 10 | 19 | 0.8 | 26 | 1.0 |
| 300 | 12 | 24 | 0.9 | 31 | 1.2 |
| 375 | 15 | 29 | 1.2 | 39 | 1.5 |
| 450 | 18 | 35 | 1.4 | 47 | 1.8 |
| 600 | 24 | 47 | 1.8 | 60 | 2.5 |

It will be readily apparent from the foregoing detailed description of the illustrative embodiments of the invention that a particularly novel and extremely effective pipe wall segment and method for manufacture of pipe is provided. While the form of apparatus and method herein described constitute preferred embodiments of the invention, it is to be understood that the invention is not limited to this precise form of apparatus and method and that changes may be made therein without departing from the scope of the invention which is defined in the appended claims.

What is claimed is:

1. An improved extruded plastic pipe structure formed comprising
   an outer surface, said outer surface having an outer surface first side and an outer surface second side,
   an inner surface, said inner surface having an inner surface first side and an inner surface second side, a plurality of primary internal cells formed between said outer surface and said inner surface, said primary internal cells extending the distance from the outer surface second side to the inner surface second side, a plurality of secondary internal cells formed between said outer surface and said inner surface, said primary internal cells being larger in size than said secondary internal cells, said number of secondary internal cells to primary internal cells being of a ratio of 2:1, said primary internal cells and said secondary internal cells extending longitudinally the length of said pipe, said pipe having a longitudinally central axis extending the length of said pipe, said primary internal cells and said secondary internal cells being wound about said longitudinal central axis in a cycle of twist, said pipe having an inner diameter with the ratio of the length of said pipe to said inner diameter for each said cycle of twist being in the range of between 2:1 to 7:1, said pipe having its complete vertical cross section formed as a unitary extruded structure.

2. The pipe structure according to claim I wherein each of said primary internal cells is of a circular shape.

3. The pipe structure according to claim 1 wherein each of said secondary internal cells is of a three-sided configuration.

4. The pipe structure according to claim I wherein each primary internal cell comprises an internal cell side wall, said internal cell side wall having a plurality of segments.

5. The pipe structure according to claim 4 wherein said internal cell wall includes a first segment, said first segment being coterminous with said outer surface.

6. The pipe structure according to claim 5 wherein said internal cell wall includes a second segment, said second segment being conterminous with said inner surface.

7. The pipe structure according to claim 6 wherein said internal cell wall includes a third segment, said third segment being intermediate said outer surface and said inner surface, and said third segment being coterminous with the internal cell wall of a first adjacent primary internal cell.

8. The pipe structure according to claim 7 wherein said internal cell wall includes a fourth segment, said fourth segment being intermediate said first and third segments.

9. The pipe structure according to claim 8 wherein said internal cell wall includes a fifth segment, said fifth segment being intermediate said second and third segments.

10. The pipe structure according to claim 9 wherein said internal cell wall includes a sixth segment, said sixth segment being intermediate said outer surface and said inner surface, and said sixth segment being coterminous with the internal cell wall of a second adjacent primary internal cell.

11. The pipe structure according to claim 10 wherein said internal cell wall includes a seventh segment, said seventh segment being intermediate said second and sixth segments.

12. The pipe structure according to claim 11 wherein said internal cell wall includes an eighth segment, said eight segment being intermediate said sixth and first segments.

13. The pipe structure according to claim 1 wherein said ratio of the length of said pipe to said inner diameter for each said cycle of twist is in the range of between 3:1 to 5:1.

14. The pipe structure according to claim 1 wherein each of said primary internal cells have as their structure closed geometric figures with two boundaries.

15. An improved extruded plastic pipe structure formed comprising an outer surface, said outer surface having an outer surface first side and an outer surface second side, an inner surface, said inner surface having an inner surface first side and an inner surface second side, a plurality of primary internal cells formed between said outer surface and said inner surface, said primary internal cells extending the distance from the outer surface second side to the inner surface second side, a plurality of secondary internal cells formed between said outer surface and said inner surface, said primary internal cells being larger in size than siad secondary internal cells, said number of secondary internal cells to primary internal cells being of a ratio of 2:1, each of said primary internal cells being of a circular shape, each of said secondary internal cells being of a three-sided configuration, each primary internal cell comprising an internal cell side wall, said internal cell side wall having a plurality of segments, said internal cell wall including a first segment, said first segment being coterminous with said outer surface, said internal cell wall including a second segment, said second segment being coterminous with said inner surface, said internal cell wall including a third segment, said third segment being intermediate said outer surface and said inner surface, and said third segment being coterminous with the internal cell wall of a first adjacent primary internal cell, said internal cell wall including a fourth segment, said fourth segment being intermediate said first and third segments, said internal cell wall including a fifth segment, said fifth segment being intermediate said second and third segments, said internal cell wall including a sixth segment, said sixth segment being intermediate said outer surface and said inner surface, and said sixth segment being coterminous with the internal cell wall of a second adjacent primary internal cell, said internal cell wall including a seventh segment, said seventh segment being intermediate said second and sixth, segments, said internal cell wall including an eighth segment, said eighth segment being intermediate said sixth and first segments, said primary internal cells and siad secondary internal cells extending longitudinally the length of said pipe, said pipe having a longitudinal central axis entending the length of said pipe, said primary internal cells and said secondary internal cells being wound about said longitudinal central axis in a cycle of twist, said pipe having an inner diameter with the ratio of the length of said pipe to said inner diameter for each said cycle of twist being in the range of between 2:1 to 7:1, said pipe having its complete vertical cross section formed as a unitary extruded structure.

16. The pipe structure according to claim 14 wherein said ratio of the length of said pipe to said inner diameter for each said cycle of twist is in the range of between 3:1 to 5:1.

17. A method for forming an improved extruded plastic pipe structure comprising the steps of:

1) extruding plastic having a circular vertical cross-section, said plastic extrudate having an outer surface, said outer surface having an outer surface first side and an outer surface second side, an inner surface, said inner surface having an inner surface first side and an inner surface second side, a plurality of primary internal cells formed between said outer surface and said inner surface, said primary internal cells extending the distance from the outer surface second side to the inner surface second side, a plurality of secondary internal cells formed between said outer surface and said inner surface, said primary internal cells being larger in size than said secondary internal cells, said number of secondary internal cells to primary internal cells being of a ratio of 2:1, said primary internal cells and said secondary internal cells extending longitudinally the length of said pipe, said pipe having its complete vertical cross section formed as a unitary extruded structure, said pipe having a longitudinal central axis extending the length of said pipe, twisting said plastic extrudate such that said primary internal cells and said secondary internal cells are wound about said longitudinal central axis in a cycle of twist, said pipe having an inner diameter with the ratio of the length of said pipe to said inner diameter for each said cycle of twist being in the range of between 2:1 to 7:1.

18. The method according to claim 17 wherein said ratio of the length of said pipe to said inner diameter for each said cycle of twist is in the range of between 3:1 to 5:1.

* * * * *